United States Patent [19]

Nitsch et al.

[11] Patent Number: 4,585,338
[45] Date of Patent: Apr. 29, 1986

[54] PHOTOGRAPHIC COPYING APPARATUS

[75] Inventors: Wilhelm Nitsch; Walter Kieslich; Helmut Treiber, all of Munich, Fed. Rep. of Germany

[73] Assignee: Agfa-Gevaert AG, Leverkusen, Fed. Rep. of Germany

[21] Appl. No.: 663,991

[22] Filed: Oct. 22, 1984

[30] Foreign Application Priority Data

Nov. 4, 1983 [DE] Fed. Rep. of Germany ....... 3339960

[51] Int. Cl.$^4$ .................... G03B 27/34; G03B 27/40
[52] U.S. Cl. ......................................... 355/56; 355/62
[58] Field of Search .................................. 355/55–62; 364/525

[56] References Cited

U.S. PATENT DOCUMENTS 3,832,058  8/1974  Gusovius ..................... 355/61 X

FOREIGN PATENT DOCUMENTS 2917176  10/1980  Fed. Rep. of Germany .

Primary Examiner—Richard A. Wintercorn
Attorney, Agent, or Firm—Michael J. Striker

[57] ABSTRACT

In a photographic copying apparatus, in which the plane of the original and the plane of the copying material are positioned at the stable distance from each other, an objective has two optical elements which are adjustable relative to a reference position by means of the associated step motors in the axial direction so as to thereby adjust an image scale and a focus distance. A computer for controlling the step motors and two memory devices, connected to the computer, are provided in the apparatus. The data of the objective characteristics are stored in the first memory and specific apparatus data, as well as individual user's data, are programmed by a user and stored in the second memory. The computer controls the step motors in accordance with the capacities of the two memory devices.

8 Claims, 4 Drawing Figures

PHOTOGRAPHIC COPYING APPARATUS

BACKGROUND OF THE INVENTION

The present invention relates to a photographic copying apparatus in which a plane of an original and a plane of a copying material, e.g. paper, are arranged at a stable distance from each other.

The photographic copying apparatus of the type under consideration includes an objective with two objective members, which are adjustable for the adjustment of a variable image scale in the copying apparatus, and step motors operative for the adjustment of the positions of those members of the objective.

The German published application No. 29 17 176 discloses a reproduction objective in which a computer calculates the reference-position values of the objective, corresponding to the image scale, and in which the optical element has the coefficients stored in the storage of the computer. With one-time application of the stored coefficients into the computer corrective values of the objective must be taken into consideration.

With the known reproduction objective the reference-positions of the individual objective structural groups are polynominals in which the various cofficients are to be multiplied by the exponents of the image scale. This construction has, however, comparatively small storage capacity but is rather expensive. Furthermore, correction possibilities in this known apparatus are quite limited.

SUMMARY OF THE INVENTION

It is an object of this invention to provide an improved photographic copying apparatus.

It is another object of the invention to provide a photocopying apparatus, in which, during the adjustment of the objective, additional corrections, as compared to the conventional copying devices of this type, would be provided without, however, making the handling and service of the apparatus more difficult.

These and other objects of the invention are attained by a photographic copying apparatus, in which a plane of an original and a plane of a copying material are positioned at a stable distance from each other, and comprising an objective including two optical elements each provided with a step motor for adjusting the associated optical element in an axial direction thereof to thereby adjust a focus distance and thus a various image scale in the apparatus; computer means connected to said step motors and controlling the latter through individual correction values of the objective applied into said computer means; a first memory, in which control values for the image scale for the adjustment of said optical elements due to calculated data of the objective and actually determined data of the objective are stored; and a second after-programmable memory in which the user's and apparatus specific influence data are stored, said computer means being connected to said first memory and said second memory and controlling said step motors for a selected image scale in accordance with the capacity of said first and and second memory.

The computer means may set both said optical elements to an initial position for beginning an adjustment process; the reference position may be always advanced in the same direction.

The first memory may be PROM which is programmed during the manufacture of the objective, said first memory being together with said objective interchangeable in the apparatus.

The second memory may be a magnetic memory which includes correction values effective for the adjustment of the objective.

The second memory may have a keyboard and be programmable by means of said keyboard by a user with user's specific correction values of the focus and the image scale.

The computer means may be programmable for an automatic sequence of illuminations of the original with incremental various focus adjustments for a visual evaluation of an optimal value of the adjustment.

Due to the provision of two memories, of which one includes only data of the objective whereas the other one can receive the data concerning the specific apparatus characterisitcs and individual data of a specific user, correction values can be applied to the computer means and taken into consideration during the calculation of the reference position of the objective in the copying apparatus. An interchanging of the unit, comprised of the objective and the first memory, is possible, without requiring the examination of the values stored in the second memory together with the init newly inserted into the apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
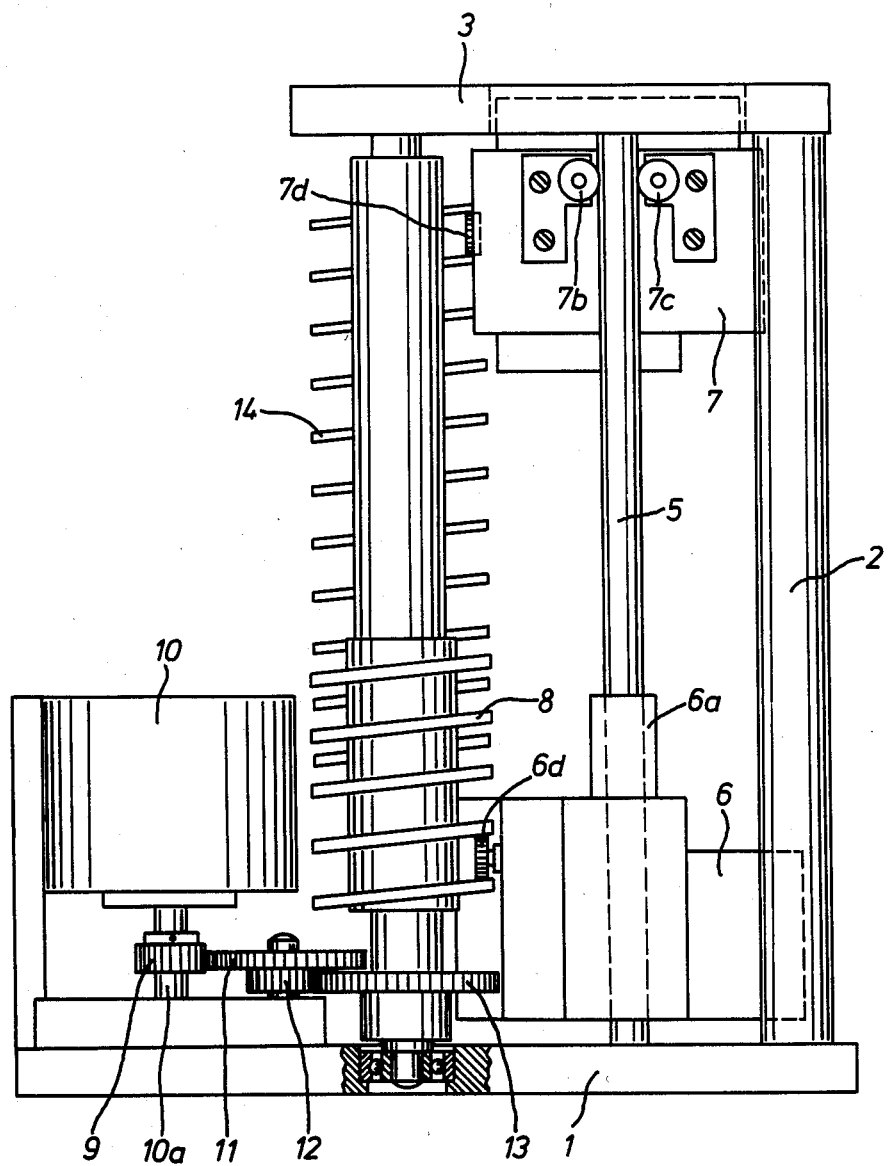
FIG. 1 is a side elevational view of an objective for a photographic copying apparatus for a variable picture scale with a stable distance between an original plane and a copying material plane.

Referring now to the drawings in detail, and first to FIG. 1 thereof, reference numeral 1 designates a stationary plate which is connected to an opposite further plate 3 by means of stay bolts 2. As can be specifically seen from the construction of the objective, shown in FIG. 3, parallel guide supports or columns 4 and 5 are interconnected between plates 1 and 3. Two optical members 6 and 7 are movable on guide columns 4 and 5 by means of longitudinal guides 6a, 7a, respectively, on the one hand, and by means of rollers 7b, 7c engagable with those columns, on the other hand.

The objective optical or elements 6, 7 are movable on columns 4, 5 play-free with low friction. The guide rollers 6d, 7d, provided on objective elements 6, 7, are connected thereto. These guide rollers 6d, 7d are engaged in two parallel spindles 8, 14, respectively, which are rotationally supported between plates 1 and 3. The front spindle, 8 as seen in FIG. 1, is driven by a gear transmission comprised of a pinion 9 mounted on a shaft 10a of a step motor 10, an intermediate gear 11, another pinion 12 and a gear 13 mounted on the spindle 8. The drive for the rear spindle 14 includes a step motor 15 and a gear transmission similar to that described for spindle 8.

A non-shown but conventional feeler is provided further on the paths of the spindles, which feeler indicates the return of the spindles to the initial position.

Figure 2:
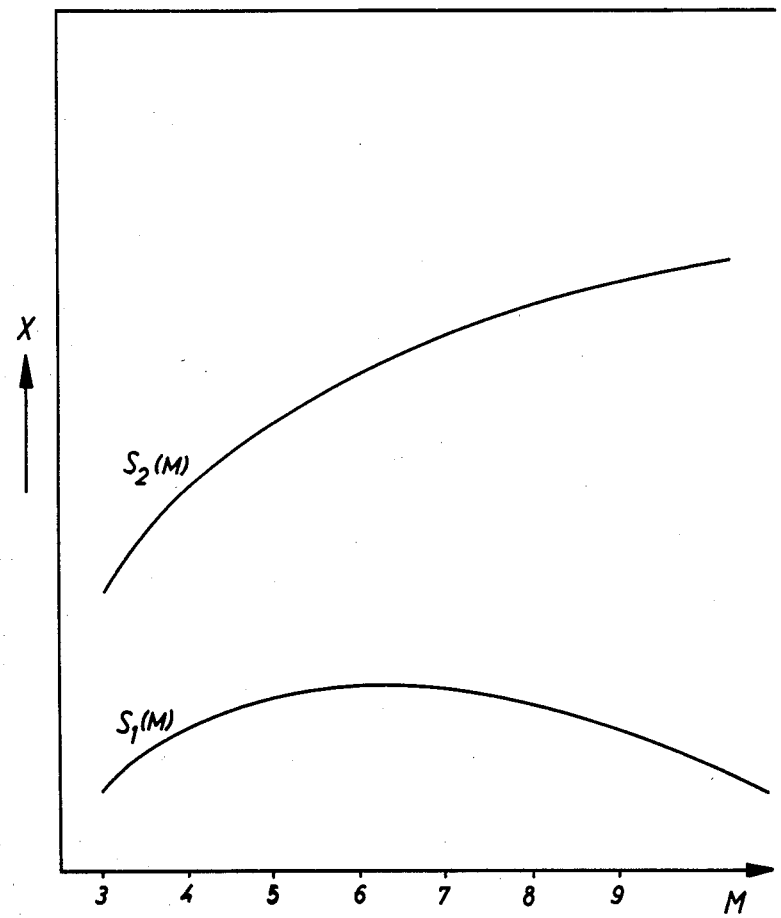
FIG. 2 is a diagram showing curves for adjusting paths $S_1$, $S_2$ of the elements of the objective of FIG. 1 with variable image scales.

Reference is now made to FIG. 2. Curves $S_1$ and $S_2$ are shown in dependence upon the image scale M which can be varied between 3 and 11. Curve $S_1$ for the lower objective element 6 extends from the initial value, over a maximal value and back to approximately the same initial value, whereas curve $S_2$ for objective element 7 has a continually increasing parabola shape.

Figure 3:
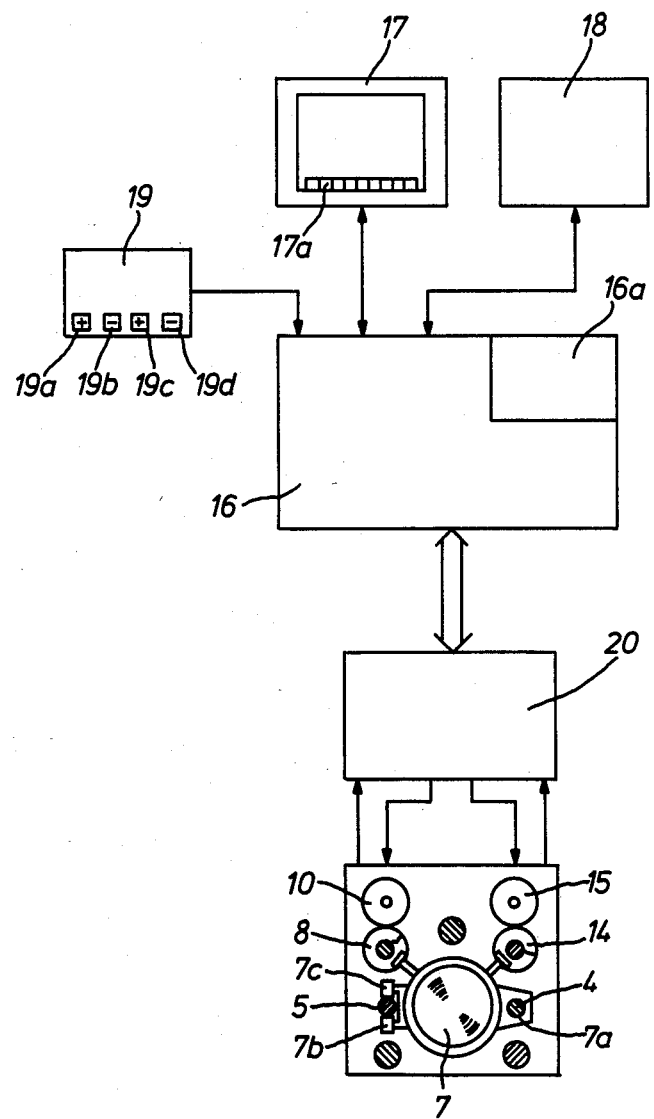
FIG. 3 is a principle diagram of the control device for the adjustment of the objective of FIG. 1.

The control device for controlling the step motors 10 and 15 is depicted in FIG. 3. This control device includes a microprocessor 16, for example microcomputer of the firm INTEL with indication 8085 or any other suitable microprocessor with at least 8 bits. A terminal 17 is connected to computer 16. Terminal 17 includes a key row or keyboard 17a. A power or drive mechanism 18 with a conventional magnetic disk or floppy disk is connected to microcomputer 16. This mechanism is further indicated as the second memory 18.

The second memory 18, which is after programmed by a user, includes two matrixes, of which one defines a coordinate for a given film format to be processed and another defines possible paper widths. All usual image scales are presented in the first matrix in correspondence with the film format and paper width, while the second matrix is originally idle.

An external input device 19 having four keys is connected by a respective lead to the computer 16. The first key 19a is a plus key and the key 19b is a minus key for the image scale M; key 19c is a plus key and key 19d is a minus key for the focus adjustment.

PROM 16a is further connected to computer 16. PROM 16a has the control curves illustrated in FIG. 2, under the consideration of respective individual deviations of the objective from a theoretical value. Computer 16 is in connection with the control electronic system 20 for step motors 10 and 15. This system includes end stages for controlling the step motors; leads from the feelers for the calculating the end position are connected to this system.

Figure 4:
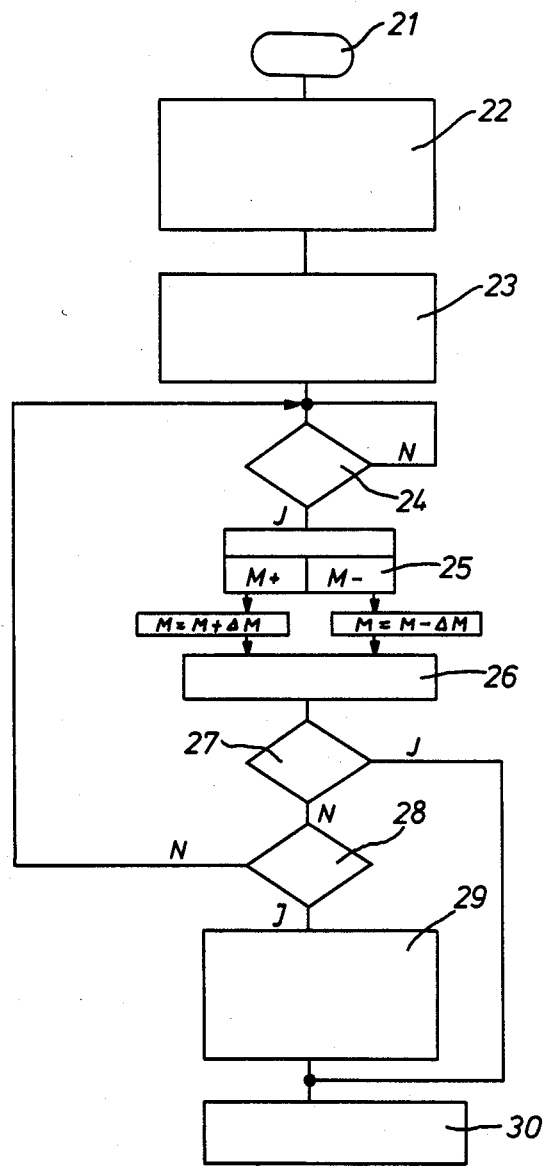
FIG. 4 is a flow chart showing an operating sequence of decisions in the control device of FIG. 3.

The function of the switching device of FIG. 3 is illustrated in the flow chart diagram of FIG. 4.

A user of the device often wishes to adjust the image scale M in his copying apparatus. It can be noted that one user can copy given originals up to the borders while another user can prefer, for operational reasons, the largest possible image scale. So each user has a possibility, by means of an adjustment routine "Variation of enlargement", to determine an optimal desired image or picture scale.

Upon the input of a signal "variation of enlargement" a start according to board or panel 21 is carried out in keyboard 17a. According to a film format "i" and paper width "j", selected in the field or frame 22 enlargement scale M depending on the configuration from memory 18 is obtained. An image screen mask for this program portion is then completed in an image screen of the terminal 17. Lamp house aperture and lock ten open (field 23).

In this position of the device the user has the possibility to examine the adjustment of the objective. For this purpose the user brings an adjustment screen in the image plane and a corresponding negative in the original plane. He or she can now examine whether the imaged original region corresponds to its introduction. By the selected key on keyboard 17a, keys 19a and 19b are brought to an active position. Keys 19a–d are arranged in a favorable position in regard to an observed projection surface.

If key 19a for the enlargement of the image scale is briefly pushed or touched by the user the image scale M will be enlarged by about 0.01 or in accordance with standard about 0.02, whereby adjustment values $S_1$ and $S_2$ will change according to FIG. 2. The user then has the possibility to examine again whether the adjusted image scale now meets his expectation or some other steps should be considered. Key 19a can be pushed for a longer period of time for a greater adjustment path whereby the steps then are performed one after another in a rapid sequence. By pushing the key 19b the movement in the opposite direction is effected.

If the result corresponds to the expectations of the user the adjusted value will be, by pressing the key "memory" in keyboard 17a, stored as a user-specific value with the combination of the film-and image format in a floppy disk 18 instead of the previous value for M. Each time, upon the occurrence of a predetermined combination of the film-and-image format will the user-specific optimal value for the image scale be received from memory 18.

Should the user abandon this program he will actuate the key in keyboard 17a. The actuation of keys 19a, b is interrogated in field 24 of the flow chart, whereby the non-pushing of the keys will lead to a repeated passing the sweep until the application of pressure on keys 19a or 19b takes place. These keys distinguish in field 25 a positive and a negative from each other whereupon the storage with respectively improved values in field 26 takes place in the floppy disk 18. Thereafter routine step are taken in field 27 by the ending of the adjustment process, and interrogation is made in field 28 on whether memory key 17a is pressed. Frame or field 29 finally defines the storage of a new value in memory 18 in place of a previous value while in a frame or field 30 for the shutting off the program a lock is again closed and lamp house aperture is also closed. Keys 19 become thereby inactive.

A further adjustment value, which can be a user-specific one, is a focus adjustment. According to a moisture content of a film the latter tends to buckle on the film platform, and there is a possibility that focus maximum would lie either on the curved middle of the original or on the ring-shape zone and the whole original should be then returned for a possible medium focus.

To provide for variations of the focus it is possible to call for a respective program according to the flow chart in FIG. 4 on the keyboard 17a and then visually determine an optimal focus by pressing the keys 19c, 19d. For changing the focus both adjustment values $S_1$ and $S_2$ are shifted parallel to each other upward or downward, depending on the selected key for a predetermined film-and-image format and a given image scale.

Now the optimally sensed values in adjusted condition are processed by pushing the key 17a in the memory 18 where they are written on the idle second matrix.

Computer 16 offers another possibility to draw, with the corresponding programming, a sequence of sample illuminations of one original, particularly suitable for focus estimation. According to a predetermined value and in correspondence with one parallel displacement of both elements 6 and 7 of the objective one copy is made and this is repeated for the estimated focus region, for example for seven times. Due to the evaluation of the sample copies it can be then determined at which adjustment an optimal value is obtained, and this adjustmentment can be made first by pressing keys 19c and 19d and then by pressing the key 17a in memory 18.

Finally memory 16a can be filled with theoretically calculated and practically measured characteristics or values or the objective even during the manufacture of the device and can be inserted in the device together with the objective. These device characteristics, which are to be eventually considered during the adjustment of the objective, are also stored in memory 18. These characteristics are, for example displacements of the original platform or the paper platform relative to a reference value, lying within permissible tolerance values. The deviations, the correction of which in a mechanical fashion would cause considerable costs, permit to substantially reduce expenses during the determination of the adjustment values for step motors 10 and 15.

Practically in operation the adjustment is performed so that for a predetermined size of the original or the paper width a corresponding individual corrected image scale is received from the first matrix of memory 18 of the computer 16. Additionally apparatus-characteristic -corrections are also made in the first matrix while individual focus corrections are received from the second matrix. A corrected image scale in accordance with the values, stored in memory 16a, is translated into the number of steps $S_1$ and $S_2$ of the step motors, and the apparatus-characteristic-corrections and the individual focus corrections are added thereto. For the beginning of the adjustment process both step motors are set back to their lower initial positions by means of the control electronic system 20. The motors 10 and 15 then execute a combined predetermined number of steps, whereby the objective will have an optimal image scale and an optimal focus.

In place of the memory with the magnetic disk another storage with a long-range and durable capacity can be employed, which would be adjustable by a user. Such memory types as EAROM, RAM with floating batteries or the like can be, for example utilized in the apparatus of this invention.

Both value groups positioned in different memories 16a and 18 can be accommodated in the separated storage spots of the common memory.

It will be understood that each of the elements described above, or two or more together, may also find a useful application in other types of photographic copying apparatus differing from the types described above.

While the invention has been illustrated and described as embodied in a photographic copying apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic copying apparatus, in which a plane of an original and a plane of a copying material are positioned at a stable distance from each other, and comprising an objective including two optical elements each provided with a step motor for adjusting the associated optical element in an axial direction thereof to thereby adjust a focus distance and various image scale in the apparatus; computer means connected to said step motors and controlling the latter through individual correction values of the objective applied into said computer means; a first memory (16a), in which control values for a selected image scale for the adjustment of said optical elements due to calculated data of the objective and actually determined data of the objective are stored; and a second after-programmable memory (18) in which values of user's and apparatus specific data are stored, said computer means being connected to said first memory amd said second memory and operated so as to control said step motors for a selected image scale in accordance with the values stored in said first and second memory.

2. The copying apparatus as defined in claim 1, wherein said computer means set both said optical elements to an initial position for beginning an adjustment process, and wherein the reference position is always advanced in the same direction.

3. The copying apparatus as defined in claim 1, wherein said first memory is PROM which is programmed during the manufacture of the objective, said first memory being together with said objective interchangeable in the apparatus.

4. The copying apparatus as defined in claim 1, wherein said second memory is a magnetic memory which includes correction values effective for the adjustment of the objective.

5. The copying apparatus as defined in claim 4, wherein said correction values are used for the compensation for the deviations of the position of a platform for the original or a platform for the copying material from a reference position.

6. The copying apparatus as defined in claim 1, wherein said second memory has a keyboard and is programmable by means of said keyboard by a user with user's specific correction values of the focus and the image scale.

7. The copying apparatus as defined in claim 4, wherein said second memory has a keyboard and is programmable by means of said keyboard by a user with user's specific correction values of the focus and the image scale.

8. The copying apparatus as defined in claim 1, wherein said computer means is programmable for an automatic sequence of illuminations of the original with incremental various focus adjustments for a visual evaluation of an optimal value of the adjustment.

* * * * *